(12) United States Patent
Kimura et al.

(10) Patent No.: US 8,726,504 B2
(45) Date of Patent: May 20, 2014

(54) METHOD OF PRODUCING TURBINE BLADE

(75) Inventors: Koji Kimura, Aichi (JP); Hiroshi Asano, Hyogo (JP); Ikuno Kumazawa, Hyogo (JP)

(73) Assignee: Daido Steel Co., Ltd., Aichi (JP)

( * ) Notice: Subject to any disclaimer, the term of this patent is extended or adjusted under 35 U.S.C. 154(b) by 0 days.

(21) Appl. No.: 13/544,275

(22) Filed: Jul. 9, 2012

(65) Prior Publication Data

US 2013/0014388 A1    Jan. 17, 2013

(30) Foreign Application Priority Data

Jul. 11, 2011    (JP) ................. 2011-152494

(51) Int. Cl.
| | | |
|---|---|---|
| *B21D 53/78* | (2006.01) | |
| *B21K 3/04* | (2006.01) | |
| *B23P 15/02* | (2006.01) | |
| *B21J 5/00* | (2006.01) | |
| *B63H 9/10* | (2006.01) | |
| *F01D 5/12* | (2006.01) | |

(52) U.S. Cl.
USPC ....... 29/889.7; 29/889.71; 72/352; 416/223 A

(58) Field of Classification Search
USPC ............ 29/889.7, 889.71; 72/352; 416/232 A
See application file for complete search history.

(56) References Cited

U.S. PATENT DOCUMENTS

| | | | | |
|---|---|---|---|---|
| 1,307,082 | A * | 6/1919 | Dahlstrand .................. | 29/889.7 |
| 2,148,672 | A * | 2/1939 | Arentzen ....................... | 29/410 |
| 2,254,629 | A * | 9/1941 | Stine .............................. | 72/337 |
| 2,972,181 | A * | 2/1961 | Hollis et al. ................. | 29/889.7 |
| 3,012,308 | A * | 12/1961 | Zech et al. ................... | 29/889.7 |
| 4,531,270 | A * | 7/1985 | Griffith et al. .............. | 29/889.7 |
| 7,089,664 | B2 * | 8/2006 | Ohishi .......................... | 29/889.7 |
| 2004/0140018 | A1 * | 7/2004 | Sato et al. ..................... | 148/417 |

FOREIGN PATENT DOCUMENTS

| | | |
|---|---|---|
| JP | 63-112039 | 5/1988 |
| JP | 2-80149 | 3/1990 |

OTHER PUBLICATIONS

U.S. Appl. No. 13/544,151 to Koji Kimura et al., which was filed Jul. 9, 2012.

* cited by examiner

*Primary Examiner* — David Bryant
*Assistant Examiner* — Jun Yoo
(74) *Attorney, Agent, or Firm* — Greenblum & Bernstein P.L.C.

(57) ABSTRACT

The present invention relates to a method of producing turbine blade, which comprises, (a) forging a plurality of turbine blades in a state where the plurality of turbine blades are integrally connected in a longitudinal direction, (b) heat treating the plurality of turbine blades in the integrally connected state, (c) machining the plurality of turbine blades in the integrally connected state, and (d) separating the plurality of turbine blades into individual turbine blades. According to the method, the number of processes for the forging work can be decreased, and forging efficiency can be enhanced. Moreover, an amount of burr which occurs during the forging work can be reduced, and hence, a yield of material can be improved, as compared with a case where the turbine blade is forged as a single body.

4 Claims, 4 Drawing Sheets

| PRODUCTION PROCESS | | CONTENTS | SHAPE |
|---|---|---|---|
| MATERIAL | | SUS410J1 ETC. |  |
| I | FORGING | (I-1) ROUGH FORGING |  |
| | | (I-2) FINISH FORGING |  |
| | | (I-3) BURR REMOVAL |  |
| II | HEAT TREATMENT/ DE-SCALING | HARDENING/ ANNEALING SHOT BLAST |  |
| III | MACHINING/ GRINDING | WHOLE SURFACE |  |
| IV | SEPARATION | |  |

METHOD OF PRODUCING TURBINE BLADE

FIELD OF THE INVENTION

The present invention relates to a method of producing turbine blade.

BACKGROUND OF THE INVENTION

As a production method of turbine blade, conventionally, a method of producing turbine blade by shaving it out of a block material one by one has been generally conducted.

However, in a case where the turbine blade is shaved out of the block material, there is such a problem that an amount of work is large, a yield of material is poor, and besides, a long time is required for the work, and it is difficult to enhance productivity.

On the other hand, a method of producing turbine blade as a single body by forging is also known. For example, forging and forming a turbine blade as a single body is disclosed in the following Patent Documents 1 and 2.

However, in a case where the turbine blades are forged as single bodies in this manner, and respectively subjected to machining, the number of processes required for forging is increased, and the number of processes of the machining thereafter is also increased.

Specifically, in case where the turbine blades which have been forged are subjected to machining, setups for the machining are first conducted, then, the machining is conducted, and thereafter, machined products are taken out. In this case, a series of processes for the machining must be carried out for each of the turbine blades which have been forged, and therefore, a lot of troubles and time are required for the machining.

Patent Document 1: Japanese Patent Publication No. JP-A-2-80149

Patent Document 2: Japanese Patent Publication No. JP-A-63-112039

SUMMARY OF THE INVENTION

The invention has been made in view of the above described circumstances, and an object of the invention is to provide a method of producing turbine blade in which the number of processes required for forging the turbine blades, and the number of processes and time required for machining can be saved, and hence, the turbine blades can be efficiently produced.

A feature of the present invention is directed towards a method of producing turbine blade, which comprises, (a) forging a plurality of turbine blades in a state where the plurality of turbine blades are integrally connected in a longitudinal direction, (b) after said forging, heat treating the plurality of turbine blades in said integrally connected state, (c) after said heat treating, machining the plurality of turbine blades in said integrally connected state, and (d) after said machining, separating the plurality of turbine blades into individual turbine blades.

In another feature, in said forging, a connecting part is provided between adjacent ends of said respective turbine blades as a superfluous part for connecting said ends of the turbine blades, and the turbine blades are forged in a state of being integrally connected in the longitudinal direction through the connecting part.

In an additional feature, in said forging, forging is carried out in such a manner that thick-walled parts having a larger wall thickness than blade parts are positioned at both ends in the longitudinal direction of adjacent two turbine blades.

As described above, according to the invention, the turbine blades are formed by forging. On this occasion, a plurality of turbine blades are forged in a state integrally connected in the longitudinal direction.

In according with this method, it is possible to form the plurality of turbine blades by forging simultaneously from a single block of forging material. As a result, the number of processes for the forging work can be decreased, and forging efficiency can be enhanced.

Moreover, an amount of burr which occurs during the forging work can be reduced, and hence, a yield of material can be improved, as compared with a case where the turbine blade is forged as a single body.

According to the invention, heat treatment for realizing desired hardness is applied, thereafter, to the turbine blades which have been forged.

Usually, hardening and annealing treatments are conducted as the heat treatment.

According to the invention, the plurality of turbine blades are subjected to the heat treatment in the integrally connected state, as described above.

In this case, it is possible to enhance efficiency of the heat treatment, because the heat treatment is conducted on the plurality of turbine blades in the integrally connected state. Moreover, in a case where the turbine blades are connected in such a manner that torsions of two blade parts may be cancelled, as shown in FIG. 1, it is advantageously possible to restrain occurrence of deformation (warp or torsion) during the heat treatment.

According to the invention, after the above-described heat treatment, machining (cutting work) for giving a desired final shape and size to the turbine blades is conducted.

On this occasion, according to the invention, the machining is conducted while the plurality of turbine blades are held in the integrally connected state.

It might also be possible to separate the plurality of turbine blades in the connected state into individual turbine blades, as a first step, and then, to apply the machining to each of the turbine blades independently. In this case, however, the number of processes of the machining is increased, and a longer time is required.

On the other hand, in a case where the plurality of turbine blades are subjected to the machining in the integrally connected state according to the invention, the number of the processes and troubles of the machining can be decreased, and the required time can be also reduced.

For example, in a case where the two turbine blades as the single bodies are individually subjected to the machining, a setup for the machining is first done for one of the turbine blades, and then, the machining is conducted. Thereafter, a product after the machining is removed from a machining device. Thereafter, the setup for the machining and the machining are conducted on the other turbine blade, and further, removal of a product after the machining is conducted. In this manner, the setups for the machining and the removal must be done twice, On the other hand, in a case where the two turbine blades, for example, are simultaneously subjected to the machining in the connected state, the processes such as the setup for the machining and the removal have to be performed only once. Therefore, the processes and time required for the machining can be reduced as a whole, and efficiency of the machining can be advantageously enhanced.

Thereafter, the turbine blades which have been machined in the integrally connected state, as described above, are separated into the individual turbine blades in the subsequent separating process.

According to the invention, in the forging process, it is possible to provide a connecting part between adjacent ends of the respective turbine blades as a superfluous part for connecting the ends of the turbine blades, and the turbine blades are forged in a state of being integrally connected in the longitudinal direction through the connecting part.

In a case where the connecting part is provided between the two turbine blades as the superfluous part as described above, it is possible to conduct the machining in the connected state, after the forging process, by grasping the connecting part with a chuck of the machining device. As a result, occurrence of sway in the turbine blades which are elongated in the connected state can be effectively prevented, and hence, the machining can be performed with high accuracy.

Moreover, according to an additional feature of the invention, in the forging process, forging can be carried out in such a manner that thick-walled parts having a larger wall thickness than blade parts are positioned at both ends in the longitudinal direction of adjacent two turbine blades.

In this manner, when the plurality of turbine blades are subjected to the machining in the integrally connected state after the forging process, it is possible to rigidly and firmly grasp and hold the two adjacent turbine blades in the connected state, by grasping the thick-walled parts which are positioned at the both ends in the longitudinal direction of the two turbine blades with the chucks of the machining device. As a result, sway of the turbine blades during the machining is restrained, and the machining can be simultaneously performed on these turbine blades with high accuracy.

Particularly, in case where a blade at a rotation side as a single body is subjected to the machining, although its blade root, which is a thick-walled part, can be grasped with the chuck at one end in the longitudinal direction, the thin blade part itself must be grasped with another chuck at the other end to conduct the machining. In this case, a part of the blade part which is grasped with the chuck must be removed by cutting after the machining.

However, according to the aforementioned additional feature, in case where both the two adjacent turbine blades are the blades, and the turbine blades are forged in a state where they are oppositely directed in the longitudinal direction so that their blade roots as the thick-walled parts are positioned at the both ends in the longitudinal direction, it is possible to apply machining to the two adjacent blades in a state where the two blade roots as the thick-walled parts which are positioned at the both ends in the longitudinal direction are grasped with the chucks. As a result, necessity of grasping the blade part having a smaller wall thickness with the chuck can be eliminated.

Figure 1:
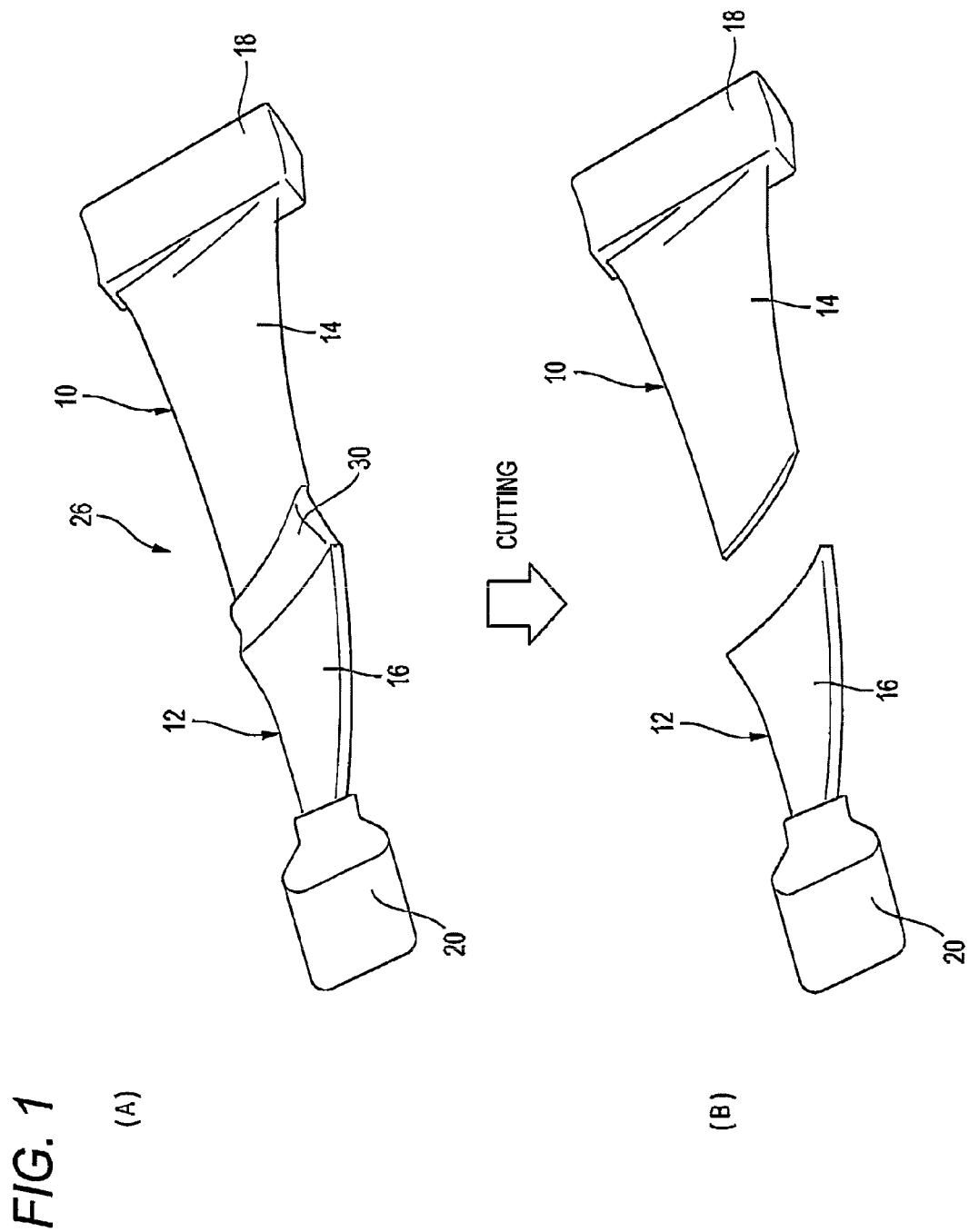
FIG. 1 is a view showing blades which are the turbine blades as one example of an object of application of production method of the invention, in a state of single bodies and in an integrally connected state.

DESCRIPTION OF THE REFERENCE NUMERALS AND SIGNS 10, 12 Blade (turbine blade)
14, 16, 36, 38 Blade part
30, 50 Connecting part
32, 34 Vane

BEST MODE FOR CARRYING OUT THE INVENTION

Now, an embodiment of the invention will be described in detail, referring to the drawings.

In (B) of FIG. 1, reference numerals 10 and 12 represent turbine blades as the object of application of the embodiment. Specifically, in this embodiment, the turbine blades 10 and 12 are blades for a gas turbine. The turbine blades 10 and 12 are respectively provided with blade parts 14 and 16 having a smaller wall thickness, and blade roots 18 and 20 having a larger wall thickness, integrally.

As material for the blades 10 and 12, material of JIS SUS410J1, DIN X12Cr13, EN 1.4006, EN 1.4024, UNS S41025, UNS S41000, AISI 410 or the like is preferably used.

In this embodiment, the blades 10 and 12 are of different types and different stage numbers. However, a difference in the stage number is only one stage. The blade 10 having a larger size is of the n-th stage, and the blade 12 having a smaller size is of the (n+1)-th stage.

Therefore, the blade 10 and the blade 12 are very close to each other in shape.

These blades 10 and 12 are fixed to a disc of a rotor at their blade roots 18 and 20 which are the thick-walled parts, thereby to rotate integrally with the rotor.

It is to be noted that the thin-walled blade parts 14 and 16 have a distorted shape. As shown in (B) of FIG. 1, the blade parts 14 and 16 are distorted in opposite directions, in a state where they are oppositely directed to each other in the longitudinal direction.

Figure 2:
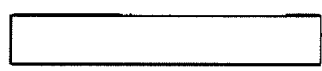
FIG. 2 is a chart for explaining processes in the production method in an embodiment according to the invention.
Figure 2:
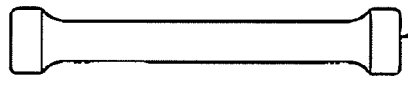
Figure 2:
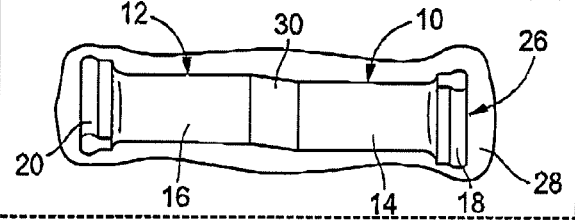
Figure 2:
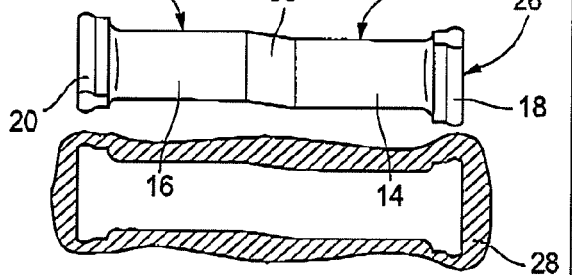
Figure 2:
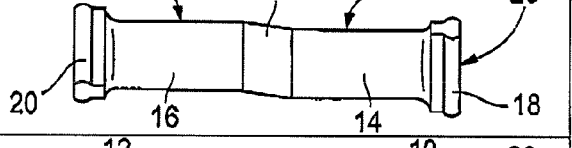
Figure 2:
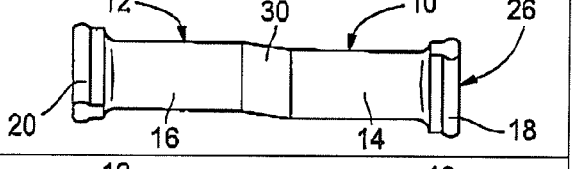
Figure 2:
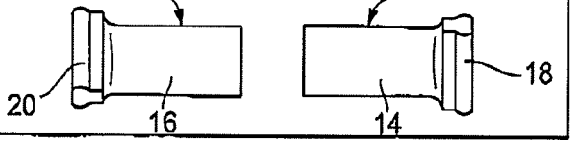
Figure 3A:
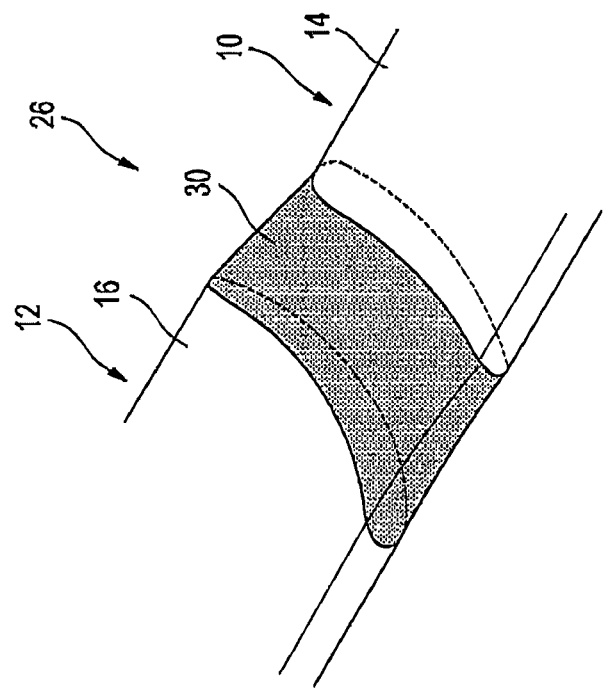
FIGS. 3A and 3B are views showing an essential part in FIG. 2 together with a comparative embodiment with respect to the embodiment according to the invention.
Figure 3B:
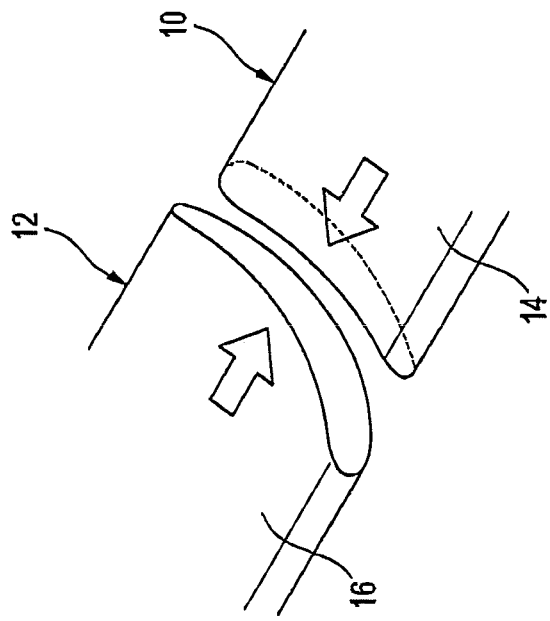

FIG. 2 shows processes in the method of producing these blades 10 and 12 in this embodiment.

In FIG. 2, reference numeral 22 represents forging material in a shape of a rod which is formed of material of JIS SUS410J1 (other materials may be used). In this embodiment, forging work is conducted using this forging material 22 as a first step, in process (I).

In this process (I), rough forging is performed in process (I-1), and through this rough forging, the forging material 22 is formed into a preformed product 24 which is provided with the thick-walled parts at both ends thereof.

Then, in process (I-2), finish forging is applied to the preformed product 24, and a connected body 26 in which the blades 10 and 12 are integrally connected in the longitudinal direction can be obtained as a finish forged product in a state provided with a burr 28.

Thereafter, removal of the burr 28 is conducted in process (I-3), and the burr 28 is separated and removed from the connected body 26.

As shown in (A) of FIG. 1 and FIG. 2, in this embodiment, the two blades 10 and 12 as the turbine blades are simultaneously forged with a single die, as the connected body 26 which are integrally connected in the longitudinal direction.

The blades 10 and 12 are integrally forged in a state where they are oppositely directed to each other in the longitudinal direction, so that the blade roots 18 and 20 as the thick-walled parts may be positioned at both ends of the connected body 26 in the longitudinal direction.

In the connected body 26, reference numeral 30 represents a connecting part which is provided between an end of the blade 10 and an end of the blade 12 as a superfluous part for connecting the respective ends of the blades 10 and 12. The blades 10 and 12 are integrally forged in a state of being connected to each other through this connecting part 30, In this embodiment, in the subsequent process (II), heat treatment for developing hardness of the blades 10 and 12 is conducted. Specifically, hardening and annealing treatments are conducted herein as the heat treatment. On this occasion, the connected body 26 in which the blades 10 and 12 are integrally connected by means of the connecting part 30 is subjected to the heat treatment.

In this process (II), oxidized scale removing treatment, that is, de-scaling treatment after the heat treatment is also conducted. Specifically, shot blast treatment is conducted in this embodiment.

Thereafter, in process (III), machining (cutting work) is carried out on whole surfaces of the blades 10 and 12. During the machining too, the blades 10 and 12 are subjected to the machining in the state where the blades 10 and 12 are connected to each other, that is, as the connected body 26.

On this occasion, the blade roots 18 and 20 having a larger wall thickness than the blade part 16 are positioned at both ends of the connected body 26 in the longitudinal direction. Therefore, it is possible to firmly and securely hold the two blades 10 and 12, that is, the connected body 26, by grasping these blade roots 18 and 20 having high rigidity with chucks of a machining device.

In addition, since the connected body 26 has the connecting part 30 in an intermediate part in the longitudinal direction, it is possible to also grasp this connecting part 30 with the chuck of the machining device, and hence, the connected body 26 can be held more firmly.

Moreover, in this embodiment, it is possible to grasp the two end parts in the longitudinal direction and the intermediate part of the connected body 26 with the chucks of the machining device, thereby to perform the machining in a state where the whole connected body is firmly and securely held. Therefore, sway of the blades 10 and 12 during the machining can be effectively prevented, and the machining can be performed with high accuracy.

In this process (III), grinding is also applied to the connected body 26.

In conducting the machining in this process (III), it is possible to subject the two blades 10 and 12 to the machining simultaneously, because the blades 10 and 12 are formed into the integrally connected body 26.

Therefore, on occasion of applying the machining to the blades 10 and 12, it is sufficient to perform a setup for the machining and removal of the product after the machining only once.

After the machining and the grinding have been finished as described above, the connecting part 30 is cut off from the connected body 26 in process (IV), thereby to separate the two blades 10 and 12 (See FIG. 1).

In this manner, the blades 10 and 12 as the single turbine blades can be obtained.

In the embodiment as described above, the two blades 10 and 12 can be simultaneously formed by forging from the one forging material 22. As a result, the number of the processes for the forging work can be decreased, and forging efficiency can be enhanced.

Moreover, since an amount of the burr 28 which occurs during the forging work can be reduced, a yield of the material can be improved, as compared with a case where the blades 10 and 20 are forged as the single bodies.

Further, in this embodiment, because the heat treatment can be conducted on the blades 10 and 12 in the integrally connected state, efficiency of the heat treatment can be enhanced.

Moreover, in this embodiment, the machining can be performed while the blades 10 and 12 are held in the integrally connected state.

As a result, the number of the processes and troubles in the machining can be decreased, and the required time can be also reduced.

Although the above description is related to the blades, it is also possible to apply the invention to production of vanes at a fixed side.

Figure 4A:
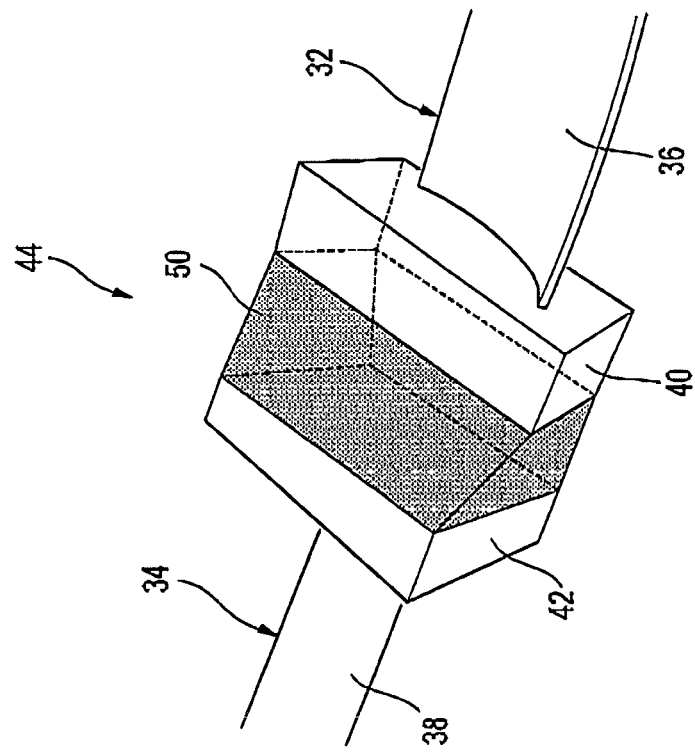
FIGS. 4A and 4B are views showing an essential part in another embodiment according to the invention with a comparative embodiment with respect to the embodiment.
Figure 4B:
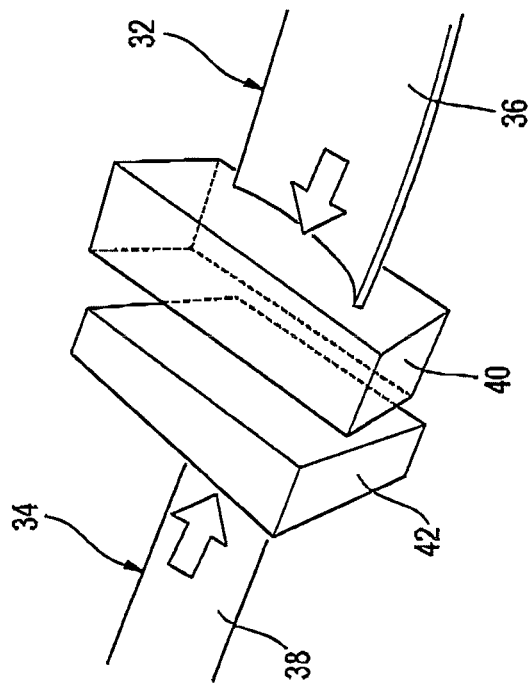

In FIGS. 4A and 4B, reference numerals 32 and 34 represent the vanes. Herein, the vanes 32 and 34 are set to be different in the stage number from each other. Specifically, the stage numbers of the vane 32 and the vane 34 are different by one stage.

Reference numerals 36 and 38 respectively represent blade parts of the vanes 32 and 34.

The vane 32 is integrally provided with a blade root (not shown) as a thick-walled part to be fixed to a turbine casing, at a right end side in the drawing, and in the same manner, the vane 34 is integrally provided with a blade root (not shown) as a thick-walled part to be fixed to the turbine casing, at a left end side in the drawing.

These vanes 32 and 34 are integrally provided with shrouds 40 and 42 to be fixed to an annular member which is formed in an annular shape around a rotor shaft, at their ends at an opposite side to the blade roots, that is, at the respective ends at a radially inner side in a state where they are fixed to the turbine casing.

Reference numeral 44 represents a connected body in which these vanes 32 and 34 are integrally connected so as to be oppositely directed in the longitudinal direction.

Specifically, also in this embodiment, these vanes 32 and 34 are integrally connected in the longitudinal direction so as to be oppositely directed in the longitudinal direction thereby forming the connected body 44.

The shrouds 40 and 42 which are juxtaposed are connected to each other by means of a connecting part 50, in the same manner as in the above described embodiment.

Incidentally, processes and procedures for forging the two vanes 32 and 34 as the connected body 44, and subsequent processes of heat treatment, machining and separating the connected body 44 into the two vanes 32 and 34 are basically same as the case of producing the blades as shown in FIG. 2.

In a case where the two vanes 32 and 34 are forged as the connected body 44 according to this embodiment, it is also possible to conduct the machining with grasping the blade roots at both ends in the longitudinal direction with chucks of the machining device.

At the same time, it is possible to conduct the machining with grasping the connecting part 50 at an intermediate part with a chuck.

The embodiments of the invention have been heretofore described in detail. However, the embodiments have been described only as examples.

For example, in the above described embodiments, it has been described a case where the two turbine blades of different types which are different from each other by only one stage in the stage number are produced by forging them in a connected state and subjecting them to the machining in the connected state. However, it is also possible, according to the invention, to produce the two turbine blades which are different by more than one stage (i.e., two stages or more) in the stage number by forging them in the connected state and subjecting them to the machining in the connected state.

Further, in the above described embodiments, a case where the two turbine blades are connected has been described. However, particularly in case of producing the turbine blades having a small size, irrespective of the blades or the vanes, it is also possible to forge a plurality of the turbine blades, more than two (i.e., three or more), in the connected state, and to conduct the machining in this connected state.

Besides, the invention can be made in such a mode that various modifications are added to the invention within a scope not deviating from a gist of the invention. For example, the invention can be also applied to production of blades for other turbines than the gas turbine.

This application is based on Japanese patent application No. 2011-152494 filed Jul. 11, 2011, the entire contents thereof being hereby incorporated by reference.

What is claimed is:

1. A method of producing turbine blades, which comprises,
forging a plurality of turbine blades in a state where the plurality of turbine blades are integrally connected in a longitudinal direction, wherein the plurality of turbine blades are of different types which are different from each other in stage numbers,
after said forging, heat treating the plurality of turbine blades in said integrally connected state,
after said heat treating, machining the plurality of turbine blades in said integrally connected state, and
after said machining, separating the plurality of turbine blades into individual turbine blades.

2. The method of producing turbine blades as claimed in claim 1, wherein in said forging, a connecting part is provided between adjacent ends of said respective turbine blades as a superfluous part for connecting said ends of the turbine blades, and the turbine blades are forged in a state of being integrally connected in the longitudinal direction through the connecting part.

3. The method of producing turbine blades as claimed in claim 1, wherein in said forging, forging is carried out in such a manner that thick-walled parts having a larger wall thickness than blade parts are positioned at both ends in the longitudinal direction of adjacent two turbine blades.

4. The method of producing turbine blades as claimed in claim 2, wherein in said forging, forging is carried out in a manner that thick-walled parts having a larger wall thickness than blade parts are positioned at both ends in the longitudinal direction of adjacent two turbine blades.

* * * * *